United States Patent [19]

Baghdasarian

[11] Patent Number: 4,726,242
[45] Date of Patent: Feb. 23, 1988

[54] METHOD AND APPARATUS FOR PRE-LOADING A THREADLESS LINEAR ACTUATOR

[75] Inventor: Varouj G. Baghdasarian, Cupertino, Calif.

[73] Assignee: Ford Aerospace & Communications Corporation, Detroit, Mich.

[21] Appl. No.: 789,534

[22] Filed: Oct. 21, 1985

[51] Int. Cl.⁴ .................................................. F16H 19/02
[52] U.S. Cl. .................................................. 74/89; 74/25
[58] Field of Search ....................................... 74/25, 89

[56] References Cited

U.S. PATENT DOCUMENTS

| | | | |
|---|---|---|---|
| 2,204,638 | 6/1940 | Weathers | 74/25 |
| 2,382,105 | 8/1945 | Sarver | 74/25 |
| 2,619,346 | 11/1952 | Weathers | 74/25 |
| 3,272,021 | 9/1966 | Weber | 74/25 |
| 3,394,599 | 7/1968 | Tucker | 74/25 |
| 3,424,012 | 1/1969 | Hirmann | 74/25 |
| 3,425,284 | 2/1969 | Shelton | 74/25 |
| 3,638,504 | 2/1972 | Zaruba | 74/25 |
| 3,670,455 | 6/1972 | Slaybaugh | 74/89 |
| 3,977,258 | 8/1976 | Bauer | 74/25 |
| 4,131,028 | 12/1978 | Gilman et al. | 74/25 |
| 4,236,415 | 12/1980 | Musial | 74/25 |
| 4,317,382 | 3/1982 | Riser | 74/25 |
| 4,347,792 | 9/1982 | Nagahori | 74/89 |
| 4,451,191 | 5/1984 | Torre | 74/89 |

FOREIGN PATENT DOCUMENTS 760443 10/1956 United Kingdom ................. 74/25

Primary Examiner—Lawrence Staab
Attorney, Agent, or Firm—Edward J. Radlo; Kenneth R. Allen; Keith L. Zerschling

[57] ABSTRACT

A threadless linear actuator apparatus comprising a sealed actuator unit with a sealed housing for a set of spool-shaped roller bearings. The roller bearing set includes at least one variable pitch loading roller and two fixed pitch rollers arranged in a skewed relationship about a cylindrical drive shaft. A variable moment is applied to the apparatus through a moment applied about an axis which is perpendicular to and intersects the drive shaft axis which, when applied, varies the pitch of the pivotable loading roller.

7 Claims, 5 Drawing Figures

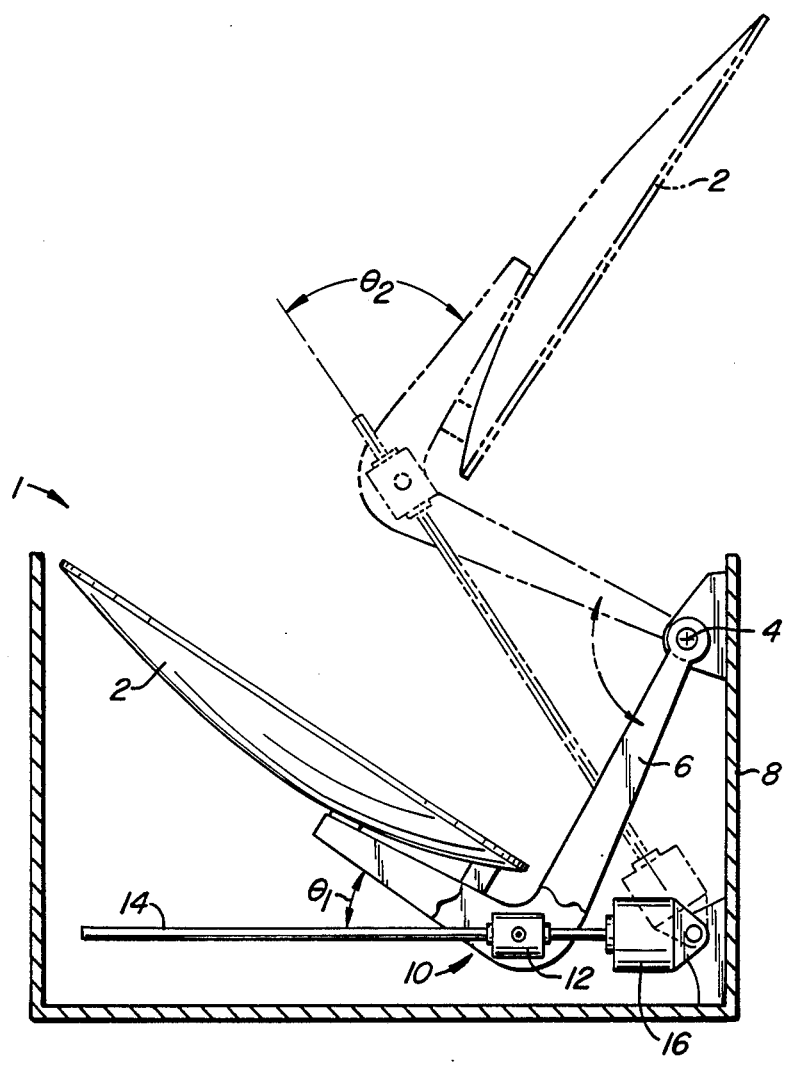
FIG._1.

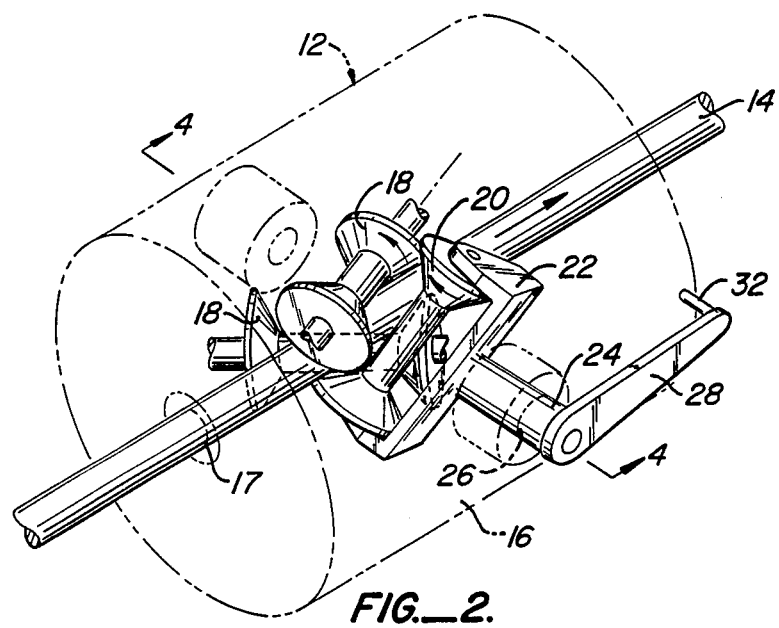
FIG._2.
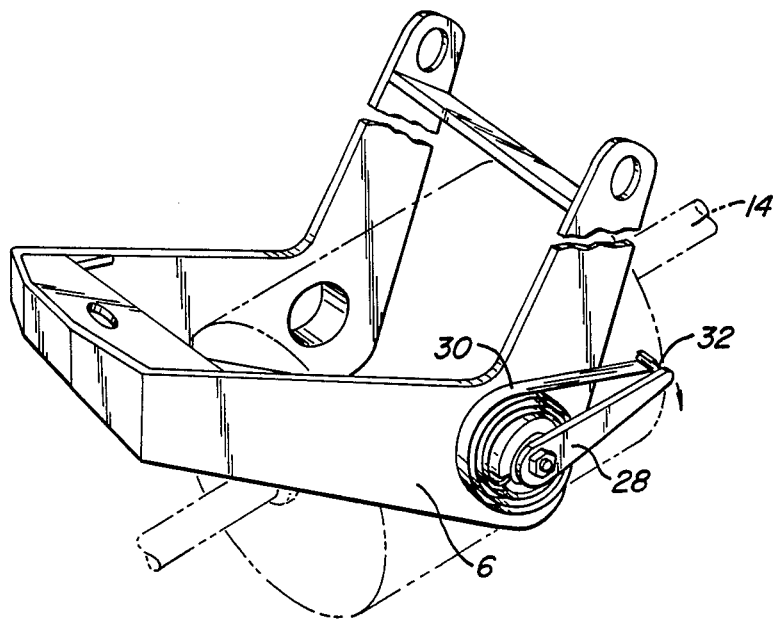
FIG._3.

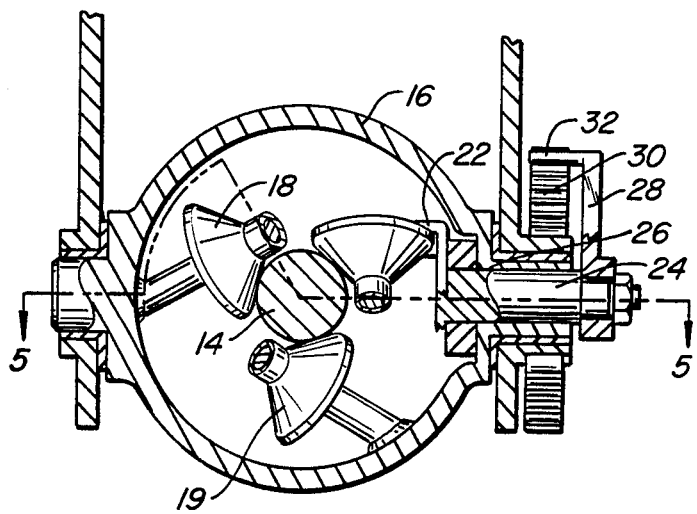
FIG._4.
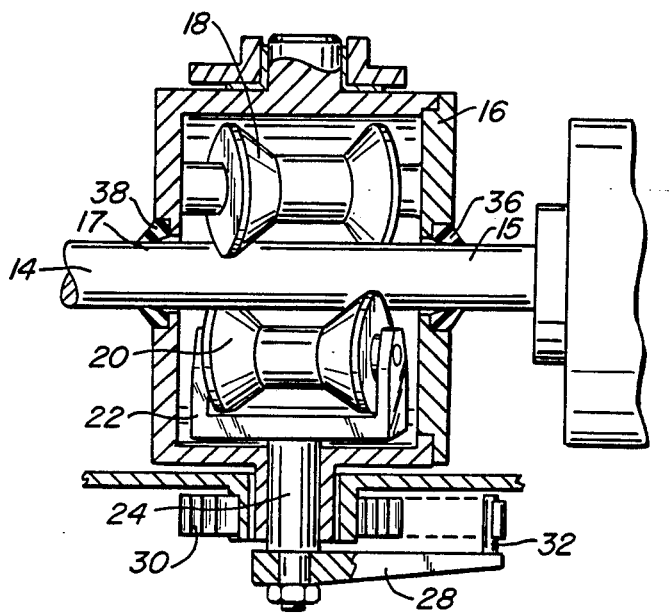
FIG._5.

METHOD AND APPARATUS FOR PRE-LOADING A THREADLESS LINEAR ACTUATOR

BACKGROUND OF THE INVENTION

This invention relates to the transfer of rotary to linear motion and in particular to mechanisms for pre-loading a drive rod with a free turning roller mechanism.

Use of a linear actuator to drive structures such as satellite tracking antennas are commonly known. Typical linear actuators employ a threaded rod and a matching threaded nut assembly for translating rotational motion of the rod into linear motion of apparatus attached to the nut assembly. By placement of the nut assembly at a moment arm with respect to a pivotally mounted antenna structure, the linear translation of the nut assembly can be employed to rotate antenna structures in either elevation or azimuth.

Unfortunately, typical threaded rod assemblies of the known designs are subject to backlash and wear which limit the directional accuracy of antenna structures. In addition, a threaded rod assembly typically does not have overload protection because of its inherent inability to slip under heavy linear loads. Consequently, other types of linear actuators are finding more and more favor in the specialized fields such as antenna rotation.

For example, a threadless screw principle is employed for high precision linear actuation without backlash. A threadless linear actuator comprises a free-turning roller mounted to engage a round shaft. The roller is typically formed of a straight right circular cylinder having a central axis at an angle relative to the central axis of the driven rod. As the rod is rotated about its central axis, the cylindrical roller translates the rotary motion of the rod into a linear motion of the roller assembly along the axis of the rod.

Pre-loading of the roller assembly against the rod has been found to be a problem. It is necessary to pre-load the roller assembly against the rod to prevent slippage. Too much pre-load may create undesired binding between the rod and the roller assembly. However, requirements for pre-load typically vary with position of the roller assembly along the rod.

Various solutions to the pre-loading problem have been described in connection with the threadless screw principle in the patent literature. For example, U.S. Pat. No. 2,204,638 describes an early door-opening mechanism in which free-rolling cylinders exert traction force on a rotating shaft for opening and closing a garage door structure. Traction force is manually adjustable by the tightening of a spring-loaded mechanism to urge pivotally mounted rollers into contact with the driving rod. There is however no suggestion of how the traction force could be rendered adjustable during the operational stroke of the mechanism. The contact area between the rotating cylinders and the driven rod is conventional. Namely, the contact area is a straight, short line at an angle to the central axis of the driven rod. The length of the line is dependent upon the relative compliance of the cylinder and the driven rod. The contact load is applied only by the forceful application of the cylinders radially against the rod.

U.S. Pat. No. 2,382,105 describes a roto-thrust converter in which rollers are also cylindrical and in which pre-loading is adjustable but only for fixed, stable conditions. Pre-loading is provided at each individual cylindrical roller, as each roller is mounted on a plunger attached to a linear adjustment mechanism.

U.S. Pat. No. 3,272,021 describes a linear actuator for use in opening and closing a vehicle window in which a driven rod rotates with respect to skew-mounted, cylindrical rollers. Of particular interest in this patent is the fact that the driven rod is of non-uniform diameter such that the position of the skew-mounted rollers on the rod determines the pre-load between the rod and the abutting rollers.

U.S. Pat. No. 2,619,346 appears to the applicant to be most relevant to the present invention of the art known to the applicant. In U.S. Pat. No. 2,619,346 a set of concave rollers is shown with a spring pre-loading mechanism that forces one end of each roller set into engagement with a rotating drive rod. Pre-load force can be varied by changing compression forces of springs acting on each respective roller thereby to force the roller into tighter radial engagement with the drive rod. In contrast to the present invention described herein, neither roller is mounted in a manner capable of being biased by a spring. The structure appears to be limited to placement of the rollers on opposing sides of the drive rod with respective axes in planes which are orthogonal (at ninety degrees) to one another. Significantly, the tapered or concave rollers in U.S. Pat. No. 2,619,346 are each of a structure such that only a small single footprint of each roller is intended to contact the drive rod. The rollers are pre-loaded with what appears to be sufficient force to constrain the rollers to single-point contact with the drive rod. Nevertheless, there is sufficient compliance in the bias to permit displacement of the roller axis laterally of the axis of the drive rod. Furthermore, the mechanism disclosed in U.S. Pat. No. 2,619,346 is not a suitable mechanism for application in satellite antenna operations because of the potential for pitch-angle change of the rollers relative to the drive rod and consequent loss of precision control.

U.S. Pat. No. 3,425,284 discloses a linear actuator employing a split block housing. The split block housing is formed in two sections having a compliant interface between opposing halves of the block. Limited pivotal movement is permitted about an axis through the pliant interface to permit changes in the spacing between halves of the split block. While the structure is not strictly used for pre-loading, there is an effect of pre-loading upon compression of the block. Significantly, this linear actuator includes mechanisms for controlling the extent of compression which happens to be performed hydraulically.

Various other patents have been uncovered showing other arrangements for pre-loading traction drive rollers. Reference is made to U.S. Pat. Nos. 3,977,258, 4,131,028 and 4,236,415.

U.S. Pat. No. 4,317,382 describes a drive mechanism in which a sealed housing is employed. Pre-loading is provided by linearly compressing the structures housed within the housing along the axis of the drive rod.

Finally, U.S. Pat. No. 4,451,191 discloses a roller assembly in FIGS. 4 and 5 which suggests the possibility of providing a sealed housing with externally biased compression rollers engaging a drive rod. In this mechanism, however, the rollers are mounted for free pivot with respect to the housing enclosure. It is noted that the rollers disclosed with respect to FIGS. 4 and 5 are specifically indicated as provided with concave or convex surfaces for facilitating engagement with the peripheral surface of the rod. However, the structure as shown would seem to suggest that the alignment of the drive rod is highly dependent upon the relative amount of loading placed upon the drive rod by the three rollers. In other words, no one or two of the rollers are so oriented to fix the position of the drive rod with respect to its housing.

SUMMARY OF THE INVENTION

According to the invention, transfer of rotary to linear motion is controlled by the use of a linear actuator to drive a structure wherein a set of tapered rollers is abutted to a round drive shaft such that each of the rollers contact the drive shaft at at least two points separated from one another.

Pre-loading is applied to the drive shaft through one of the tapered rollers which is adjustable about an axis normal to the drive shaft. Adjustment is made by applying a moment to the normal axis. Further according to the invention, application of moment to the tapered roller set can be varied by placement of moment controlling means external to the housing enclosing the roller set such that the moment is varied with displacement of the roller set along the drive rod. The moment induces a slight but significant rotation to the tapered roller set.

The structural combination typically comprises a plurality of roller sets mounted within a sealed housing through which a drive rod is passed, at least two of the roller sets being rigidly fixed with respect to the housing to assure rigid and precise alignment of the rod and concentricity of the roller sets about the drive rod.

The tapered roller assembly in connection with the threadless drive rod and controlled pre-load has numerous advantages. For example, the traction drive assembly can slip in a controlled manner due to overload, thus protecting the entire drive system and the structure against unnecessary damage. The slip load is a function of the pre-load of the rollers and therefore is, according to the invention, variable based on placement of the rollers along the drive rod. The variable loading feature in a dish antenna control environment allows for reduced loads and reduced drive power requirements at selected low elevation angles and the like wherein loading requirements and slipping requirements are reduced. These features increase the lifetime of the components by reducing the wear factor due to loading.

By placing the entire roller assembly within a completely enclosed and sealed container which is translatable along the drive rod, the critical wear parts are protected against undesired wear otherwise due to environmental exposure. The enclosure also prevents the build-up of ice adjacent the roller mechanism, which can cause the roller set housing to freeze.

The invention will be best understood by reference to the following detailed description taken in connection with the accompanying drawings.

BRIEF DESCRIPTION OF THE DRAWINGS

FIG. 1 is a side view of a linear actuator assembly installed in an antenna drive assembly.

FIG. 2 is a perspective detail view of a drive rod and tapered roller set.

FIG. 3 is a perspective view of the moment loading and pre-loading mechanism of the reflector support arm in accordance with the invention.

FIG. 4 is a cross-sectional view of the roller assembly taken along the line 4—4 shown in FIG. 3.

FIG. 5 is a cross-sectional view of the roller assembly taken along the line 5—5 shown in FIG. 4.

DESCRIPTION OF SPECIFIC EMBODIMENTS

FIG. 1 illustrates an application of the linear actuator of the present invention to an antenna 1 in which the reflector 2 must be adjustable in elevation. The reflector 2 is shown in solid lines at the 90° elevation, and in broken lines at the 0° elevation position. At the 90° elevation, signals reflected from the focal area of the reflector are directed vertically upward, while at the 0° elevation, the signals are directed at the horizon.

The reflector 2 rotates about an axis 4 provided by the pivotal mounting of the reflector arm 6 to the antenna cover 8. The linear actuator mechanism 10 drives the reflector arm 6 mounted with a roller assembly 12 along the length of the drive shaft 14. A motor 16 at the mounted base of the drive shaft 14 provides for the rotation of the smooth shaft 14.

The cutaway view of FIG. 2 illustrates one embodiment of a tapered roller assembly 12 according to the invention in detail. Within a completely enclosed housing 16 (shown in phantom lines) are fixed rollers 18, 19 and an adjustable roller 20. The fixed rollers are disposed around the drive shaft 14 with the axes of rotation of both rollers 18, 19 inclined at the same angle to the axis of rotation of shaft 14 to produce the angle of pitch which determines the distance the housing travels as the shaft 14 is rotated. The fixed rollers are mounted within the housing so that their central axes are constrained to remain a fixed distance from the central axis of shaft 14. Minimum resistance to the travel of the housing exists when adjustable roller 20 is arranged to have the same pitch as the fixed rollers 18, 19. As adjustable roller 20 is twisted, the load between the shaft and the roller assembly may be decreased or increased.

Adjustable roller 20 is mounted on a movable clevis 22 fixed to a clevis shaft 24 which extends through the wall of the housing 16 through a clevis shaft opening 26 and terminates in a loading arm 28.

To vary the load on the mechanism, a torque which varies with the position of the roller bearing set along the shaft is applied through the adjustable loading roller 20. The variable moment is applied to the adjustable roller 20 by the coil spring 30, which can best be seen in FIG. 3. One end of the spring 30 is fixed to the torque pin 32 at the end of the loading arm 28, while the other end is fixed to a stationary position on the reflector support arm 6. The position of the torque arm 28 relative to the housing 16 varies slightly according to the position of the roller assembly 12 along the drive shaft 14 so that the torque arm 28 remains generally parallel at all times to the drive shaft 14. As the reflector is moved from 90° elevation to 0° elevation as illustrated in FIG. 1, the angle $\theta$ between the axis of shaft 14 and the reflector support arm 6 changes from $\theta_1$ to $\theta_2$ (FIG. 1). This change in $\theta$ results in the (clockwise) tightening of springs 30 (FIG. 3), which results in the imparting of a slight twist to clevis 22, causing a change in the pitch of adjustable roller 20. The tightening of the spring 30 imparts a greater load between the roller assembly 12 and the drive shaft 14 as the roller assembly travels along the shaft. Thus, the moment and loading vary with the displacement from the pivot mounting of the drive shaft axis 34.

FIGS. 4 and 5 illustrate the mounting of the fixed rollers 18, 19 to the housing 16 and the mounting arrangement for the adjustable roller 20. Each spool-shaped roller, with its tapered or frustoconical ends, contacts the drive shaft at two locations at either end of each roller. The fixed rollers 19 are constrained to remain at a fixed distance from drive shaft 14 by their mounting on axles which are fixed within housing 16. The pitch angle of the fixed rollers 18, 19 determines the rate at which the actuator travels along drive shaft 14 as the shaft is rotated. In FIG. 4, the "footprint" of one-half of each of the rollers 18, 19, 20 on the driven shaft 14 is shown. The spool-shaped rollers contact the shaft in a symmetrical fashion at the opposite half of each roller (not shown).

The apparatus can be designed to withstand a certain load by adjusting the torque applied by the coil spring 30 to vary the movement applied through the loading roller 20. Once the designed pre-load is exceeded, the roller mechanism 12 may slip on the drive rod 14 without damage to the shaft or the actuator mechanism.

The two "footprints" of each roller on the shaft define the entire contact area of the rollers with the shaft. The frictional engagement and rotation of the rollers are not subject to backlash, thereby permitting precise control of the movement of the linear actuator.

The housing completely encloses the roller assembly except for the opening 26 for the clevis shaft 24 and the openings 15, 17 for the drive shaft 14. Each of the openings 15, 17 is provided with tapered gaskets 36 and 38, respectively, to protect the interior of the housing and to scrape off any ice or obstruction which might collect along shaft 14. The encloseability of the roller assembly 12 prevents environmental contamination from dust, dirt or moisture which could deleteriously affect the operation of the linear actuator.

The foregoing is a complete description of the invention, but is not intended to limit the scope of the invention, except as stated in the appended claims. While the above provides a full and complete disclosure of the preferred embodiment of the invention, various modifications, alternate constructions, and equivalents may be employed without departing from the true spirit and scope of the invention. For example, the pre-loading spring arrangement which varies the torque applied to the loading roller might have been included within the housing arrangement. Therefore, the above descriptions and illustrations should not be construed as limiting the scope of the invention which is defined by the appended claims.

What is claimed is:

1. A threadless linear actuator apparatus for the translation of rotary to linear motion along a single diameter cylindrical drive shaft comprising:
 a sealed actuator unit having a housing for enclosing a roller bearing set;
 said roller bearing set including at least one loading roller and at least two fixed rollers mounted to said housing wherein said loading roller and said fixed rollers frictionally and rotatively engage said drive shaft with the roller axes in skewed relationship to the longitudinal axis of said drive shaft, said fixed rollers having a fixed pitch angle between each roller axis and the drive rod axis; and said loading roller having a variable pitch angle between the loading roller axis and the drive rod axis; and
 a moment control means for applying a variable torque to the loading roller which varies according to the position of the actuator unit along said drive rod wherein said moment control means comprises:
 a clevis for varying the loading roller pitch angle and for mounting said loading roller, said clevis further comprising a clevis shaft pivotally mounted on said housing; and a coil spring fixed at one end to a portion of the apparatus whose position relative to said housing varies according to position of said actuator unit along said drive shaft, and spring being fixedly mounted at its other end to said clevis.

2. The moment control means of claim 1, wherein said loading roller pivots with said clevis about an axis which is perpendicular to an intersects said drive shaft axis.

3. The roller bearing set of claim 1, wherein said fixed rollers and said loading rollers are spool-shaped such that each roller contacts said drive shaft at two spaced-apart positions.

4. The roller bearing set of claim 3, wherein said spool-shaped rollers comprise a central cylindrical roller shaft and a pair of spaced-apart frustoconical ends along said roller shaft whereby each frustoconical end contacts said drive shaft at a single position.

5. A threadless linear actuator apparatus for the translation of rotary to linear motion, comprising:
 a single diameter cylindrical drive shaft;
 a sealed actuator unit having a housing for enclosing a roller bearing set;
 said roller bearing set including spool-shaped rollers having frustoconical ends, comprising at least one loading roller and at least two fixed rollers mounted to said housing wherein said rollers are disposed about said drive shaft to frictionally and rotatively engage said drive shaft such that said fixed roller axes are arranged at an acute fixed pitch angle relative to the drive shaft axis and said loading roller axis is arranged at a variable pitch angle to the drive shaft axis; and
 a moment control means for applying a variable torque to said loading roller by varying the loading roller pitch angle, the torque varying according to the position of the actuator unit along the drive shaft, and the torque being applied along a moment axis which is perpendicular to and intersects the drive shaft axis wherein said loading roller is mounted on a clevis fixed to a clevis shaft which has an axis of rotation which is perpendicular to and intersects the drive shaft axis, said moment control means further comprising a spring fixed to one end to said clevis shaft, said spring varying in compression with the distance of the actuator unit along said drive shaft.

6. A method for pre-loading a cylindrical drive shaft comprising the steps of:
 engaging a roller bearing set of spool-shaped rollers in contact with said drive shaft such that each roller contacts said drive shaft in at least two locations;
 loading at least one of said rollers with a moment directed about an axis which is normal to the drive shaft axis with said roller bearing set constrained to remain a fixed relative distance from said drive shaft; and
 varying said loading with the distance of said bearing set along said drive shaft.

7. The method of claim 6, wherein said moment is further directed about an axis which intersects the drive shaft axis.

* * * * *